United States Patent [19]
Defranould et al.

[11] 4,069,507
[45] Jan. 17, 1978

[54] DEVICE FOR THE TWO-DIMENSIONAL READING OF OPTICAL IMAGES, USING ELASTIC SURFACE WAVES

[75] Inventors: Philippe Defranould; Jean Desbois, both of Paris, France

[73] Assignee: Thomson-CSF, Paris, France

[21] Appl. No.: 725,242

[22] Filed: Sept. 21, 1976

[30] Foreign Application Priority Data

Sept. 26, 1975 France .................................. 75 29607

[51] Int. Cl.² ............................................. H04N 5/30
[52] U.S. Cl. ................................. 358/213; 250/211 R; 310/366
[58] Field of Search ...................... 358/213; 250/211 J, 250/211 R, 578; 310/8.1, 8.3, 9.8; 340/173 LS

[56] References Cited

U.S. PATENT DOCUMENTS 3,893,047  7/1975  Lardot .............................. 310/9.8 X

*Primary Examiner*—Robert L. Richardson
*Attorney, Agent, or Firm*—Roland Plottel

[57] ABSTRACT

A device for reading two-dimensional optical images. It comprises a piezoelectric substrate on which two transducers transmit elastic waves in two separate directions, and a semiconductive and photoconductive layer arranged near the surface of the substrate, in which a nonlinear interaction occurs opposite the point where the two said directions converge. This point of convergence forms a reading point of the image which is projected onto the photoconductor, this point moving as a function of time along a straight line which forms an analysis line of said image.

14 Claims, 9 Drawing Figures

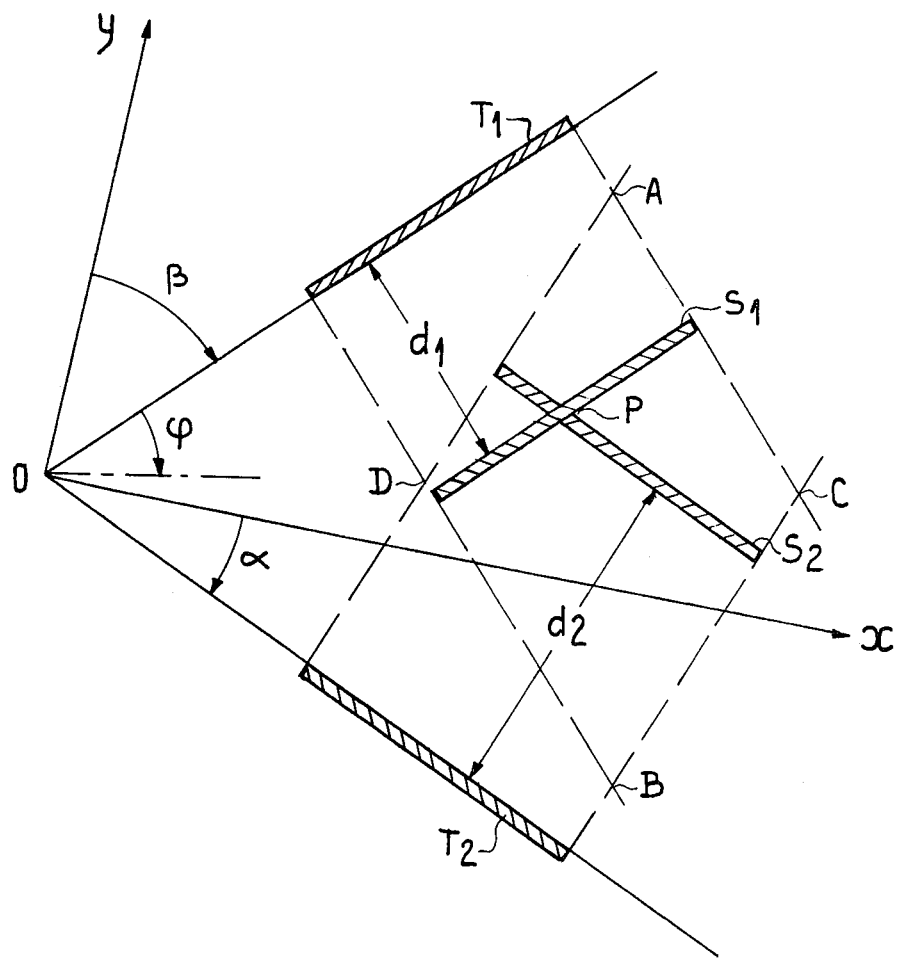

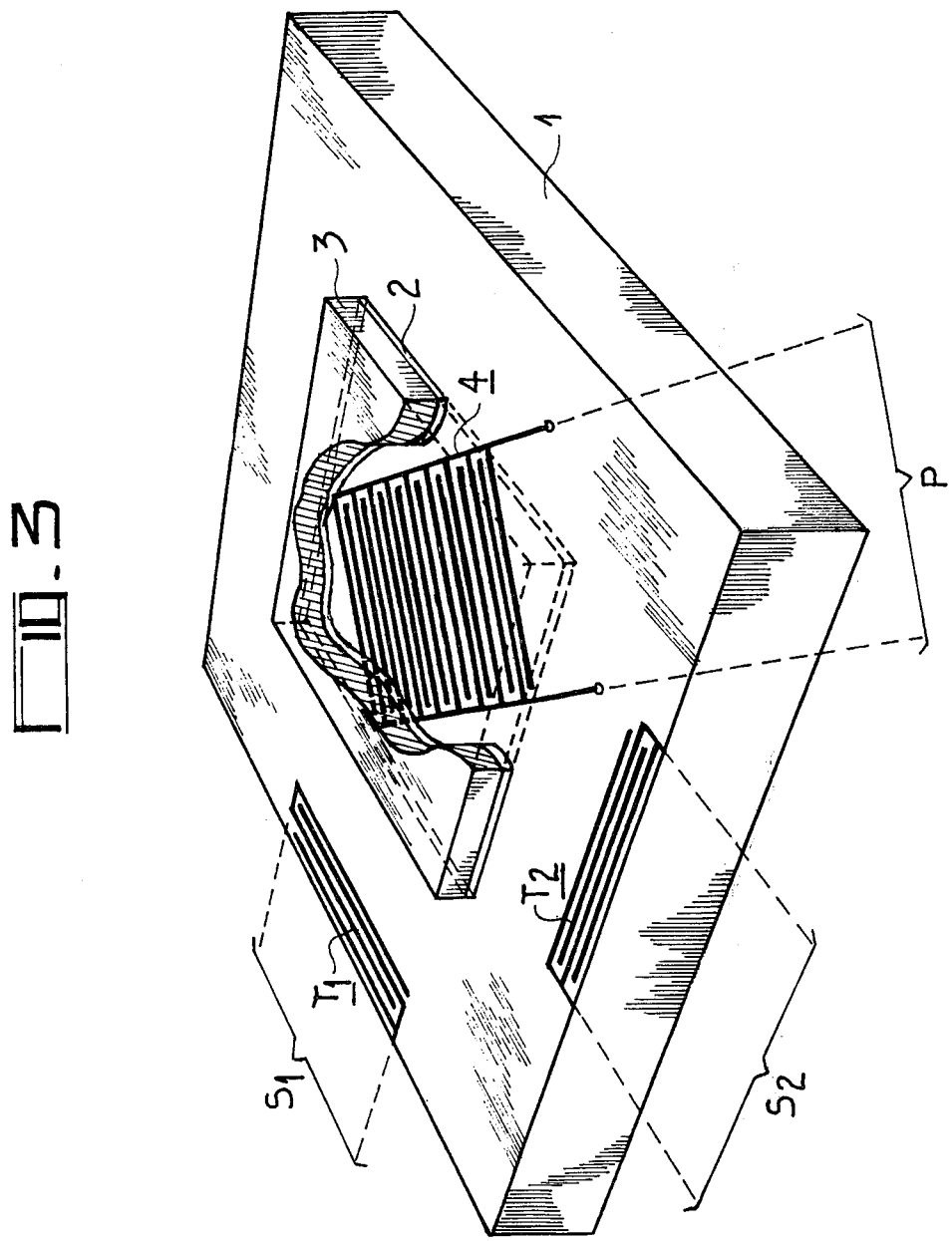

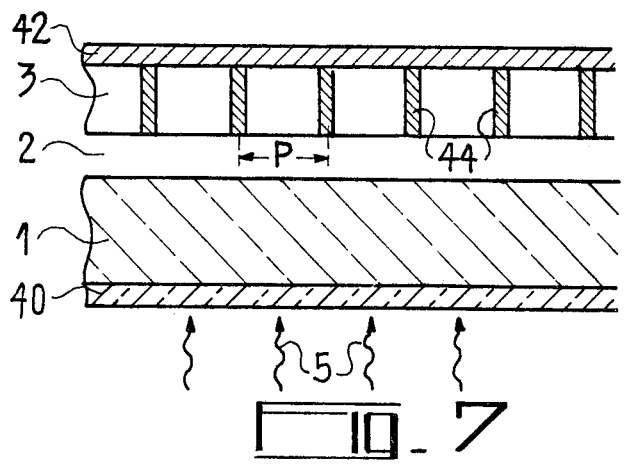
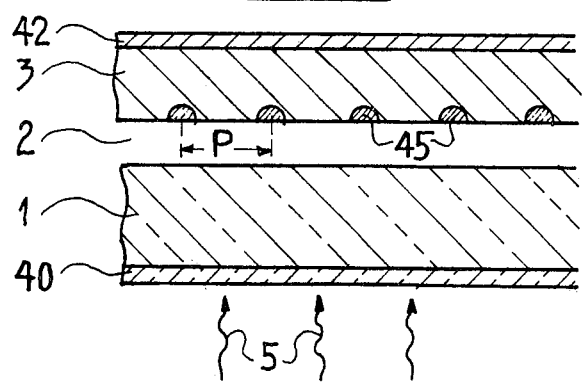
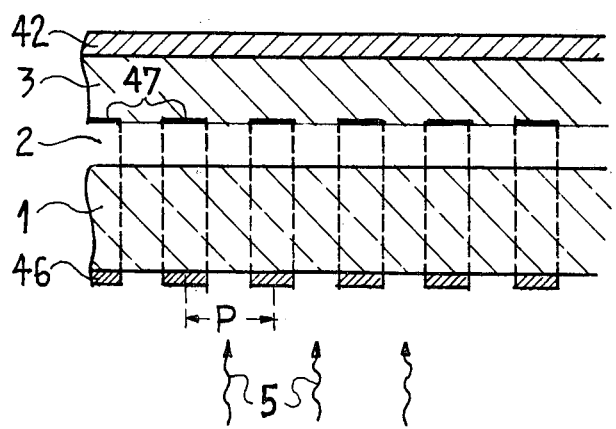

DEVICE FOR THE TWO-DIMENSIONAL READING OF OPTICAL IMAGES, USING ELASTIC SURFACE WAVES

This invention relates to a device for the two-dimensional reading of optical images by means of elastic surface waves.

The reading of images by means of elastic waves is generally carried out by means of nonlinear interactions between two electrical fields being the fields associated with the deformations of a piezoelectric crystal, over which elastic surface waves are propagated and which is situated in the proximity of the semiconductor. The signal representing the interaction may be the electrical current which arises out of this interaction and which flows through the semiconductor.

One type of structure which may be used for this purpose consists of a piezoelectric crystal, at the surface of which elastic waves are capable of being propagated, and of a semiconductor crystal separated from the piezoelectric substrate by a dielectric layer (air for example). The structure may also be formed by a single crystal, providing the crystal used is both piezoelectric and semiconductive. This structure which will be understood too hereinafter, each time reference is made to a structure with separate media. The image to be read is projected onto the semiconductor where, by spatially modulating the conductivity of the semiconductor, it modulates the intensity of the signal arising out of the nonlinear interaction.

Accordingly, conventional devices enable light information to be read in one dimension. The object of the present invention is to provide a device by which it is possible to read an optical image in two dimensions.

According to the invention, there is provided a device for the two-dimensional reading of an optical image using elastic surface waves, comprising a first piezoelectric medium at the surface of which elastic waves are capable of being propagated, and a second medium which is both semiconductive and photoconductive and in which the electrical fields associated with said elastic waves are capable of creating nonlinear interactions and where said image is projected, producing therein a spatial variation in conductivity, said first medium carrying at least two electromechanical transducers which transmit elastic surface waves having the same frequency, in two separate directions of which the intersection defines a zone of interaction where said nonlinear interactions occur, the intensity of said interactions being modulated by said spatial variation in conductivity, said waves being transmitted respectively by said transducers with a period at least equal to the scanning time of the zone of interaction by an elastic wave and with variable relative delays, said device further comprising means for extracting the time independent signals produced by said nonlinear interaction, said extracting means having a spatial periodicity which corresponds to the one of said time independent signals.

For a better understanding of the invention and to show how it may be carried into effect, reference will be made to the following description in conjunction with the accompanying drawings, wherein:

FIG. 1 is an explanatory diagram.

FIG. 3 shows one embodiment of the device according to the invention.

FIGS. 4 to 8 show variants of this embodiment.

In these various Figures, the same elements are denoted by the same references.

The diagram of FIG. 1 shows two electromechanical transducers $T_1$ and $T_2$ which, under the action of electrical signals ($S_1$ and $S_2$), transmit elastic waves (also called $S_1$ and $S_2$ for the sake of simplicity) in two separate directions to the surface of a piezoelectric material.

The propagation paths of the waves $S_1$ and $S_2$ are substantially normal to the transducers $T_1$ and $T_2$ and, at their intersection ABCD, define the zone of interaction of the elastic waves which forms the useful surface onto which the image to be read may be projected, as will be explained hereinafter.

The directions are defined in relation to rectangular axes xOy: the axis carrying the transducer $T_1$ forms an angle $\beta$ with Oy, whilst the axis carrying the transducer $T_2$ forms an angle $\alpha$ with Ox.

Figure 2A:
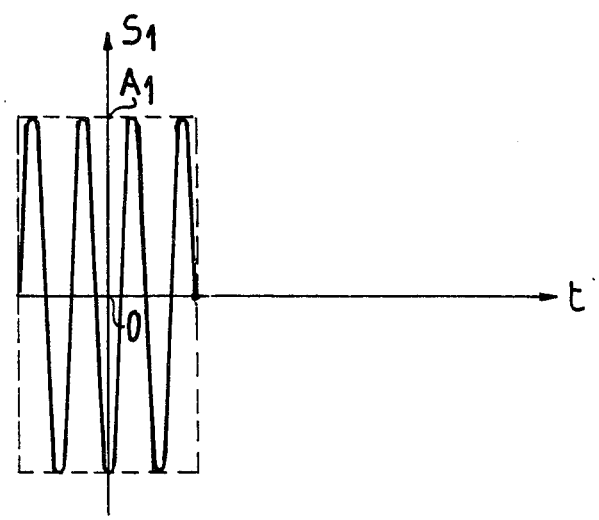
FIGS. 2a and 2b show forms of signals which may be used in the device according to the invention.
Figure 2B:
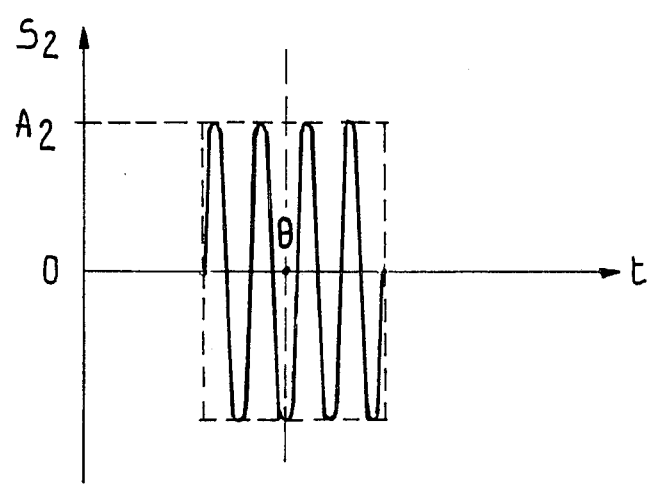

By way of example, the signals transmitted by $T_1$ and $T_2$ are the pulse signals which are shown in FIGS. 2a and 2b:

$S_1$ transmitted by $T_1$ with a carrier frequency $\omega_1$, a wave number $k_1$ and a propagation velocity $V_1$, a rectangular envelope of amplitude $A_1$, taken at any instant as the time origin (FIG. 2a);

$S_2$ transmitted by $T_2$ with a carrier frequency $\Omega_2$, a wave number $k_2$ and a propagation velocity $V_2$, a rectangular envelope of amplitude $A_2$, delayed at any instant by $\theta$ in relation to $S_1$.

The central interaction point of the two waves is represented by the intersection of the straight lines of said waves, of which the equations are as follows (in the reference axes xOy):

$$y \sin \beta - x \cos \beta + V_1 t = 0$$

$$y \cos \alpha + x \sin \alpha - V_2(t - \theta) = 0$$

As a function of time, this point of intersection describes a straight line $y = ax + b$ with $$a = \frac{V_1 \sin \alpha - V_2 \cos \beta}{V_1 \cos \alpha + V_2 \sin \beta}$$

The position of this straight line in the zone ABCD is determined by its original ordinate which is:

$$b = - \theta \frac{V_1 V_2 \cos (\alpha - \beta)}{V_1 \cos \alpha + V_2 \sin \beta}$$

Scanning along a network of parallel lines is obtained by varying $b$, i.e. the relative delay $\theta$ between the two signals $S_1$ and $S_2$.

FIG. 3 shows a first embodiment of the device according to the invention. It comprises a piezoelectric substrate 1 on which are deposited the two electromechanical transducers $T_1$ and $T_2$ formed, for example, conventionally by two electrodes in the form of interdigital combs and, in the zone of interaction defined by the elastic waves transmitted by $T_1$ and $T_2$, a dielectric layer 2 (for example air) separating the substrate 1 from a photoconductive and semiconductive layer 3, such as silicon. The device further comprises means for extracting the signal arising out of the nonlinear interaction which, in FIG. 3, consist of two electrodes in the form of interdigital combs of which the fingers are oriented at 45° in relation to those of the transducers $T_1$ and $T_2$ which are normal to one another.

The image to be read is projected onto the photoconductive layer 3 and produces in it a spatially nonuniform conductivity which is modulated by the amplitude of the signal supplied by the nonlinear interaction.

It is known that the signal S arising out of the nonlinear interaction has the following expression:

$$S = K \cdot A_1 \cdot A_2 \exp(i\phi)$$

where $K$ is an effectiveness coefficient of the interaction which translates the modulation mentioned above, and $$\phi = (\omega_1 \pm \omega_2)t - (\vec{K_1} \pm \vec{K_2}) \cdot \vec{OP}$$
$$= \Omega \cdot t - \vec{K} \cdot \vec{OP}$$

$\vec{k_1}$ and $\vec{k_2}$ being the wave vectors of the waves $S_1$ and $S_2$. They have the following components in the reference axes $xOy$:

$$\vec{k_1} \begin{cases} \frac{\omega_1}{V_1} \cos\beta \\ \frac{\omega_1}{V_1} \sin\beta \end{cases} \qquad \vec{k_2} \begin{cases} \frac{\omega_2}{V_2} \sin\alpha \\ \frac{\omega_2}{V_2} \cos\alpha \end{cases}$$

Accordingly, the interaction comprises two modes, one called the "sum" and characterised by the frequency/wave vector couple:

$$\Omega = \omega_1 + \omega_2; \vec{K} = \vec{k_1} + \vec{k_2}$$

and the other called the "difference" and characterised by the couple:

$$\Omega = \omega_1 - \omega_2; \vec{K} = \vec{k_1} - \vec{k_2}$$

The site of the equiphase points (at $2n\pi$) is formed by a network of parallel straight lines having a periodicity $p$ in the direction $\vec{K}$, such that:

$$p = 2\pi/|\vec{K}|$$

In cases where $\alpha = \beta = 0$, i.e. in the case of two transducers $T_1$ and $T_2$ transmitting elastic waves in normal directions, as shown in FIG. 3, and $V_1 = V_2$ and $\omega_1 = \omega_2$, which means that $k = k_1 = k_2$, the following result is obtained for the difference mode:
$\Omega = 0$, $|\vec{K}| = k\sqrt{2}$ and $p = (2\pi/k\sqrt{2})$, that is to say a time independent signal (since $\Omega = 0$).

The signal S can only be propagated if a mode of propagation exists with a phase velocity equal to $p(2\Omega/2\pi)$. This mode generally does not exist and the signal has to be collected where it is formed by any sensor means (4 in FIG. 3) which enable a signal having a phase modulation of spatial period $p$ to be extracted, such as two electrodes in the form of interdigital combs of period $p$. It is this which is shown in FIG. 3.

It should be noted that the image to be read may be projected either directly from the side of the photoconductor 3 or from the side of the substrate 1 if, as in the present case, the layer 3 is not transparent, and that the electrodes of the sensor 4 may be deposited either on the surface of the substrate 1 or on the surface of the semiconductor 3. These electrodes may be transparent or at least semitransparent to allow the light information through, or even opaque in the case of a mode of operation similar to that which will be described with reference to FIG. 8, the choice being made in such a way as to ensure the best possible reception of the signal.

So far as the signals $S_1$ and $S_2$ used for reading the image are concerned, the use of pulse of brief duration was described above. The formation of a frame from a series of lines requires the transmission of a series of pulses from each transducer with a period equal to the scanning time of a line, and an increase in the relative phase shift $\theta$ of the pulses which makes it possible to pass from one line to the other.

In addition, the resolution of the image may be regulated by the duration of the pulses $S_1$ and $S_2$, the size of the zone P being determined by this duration.

Figure 4:
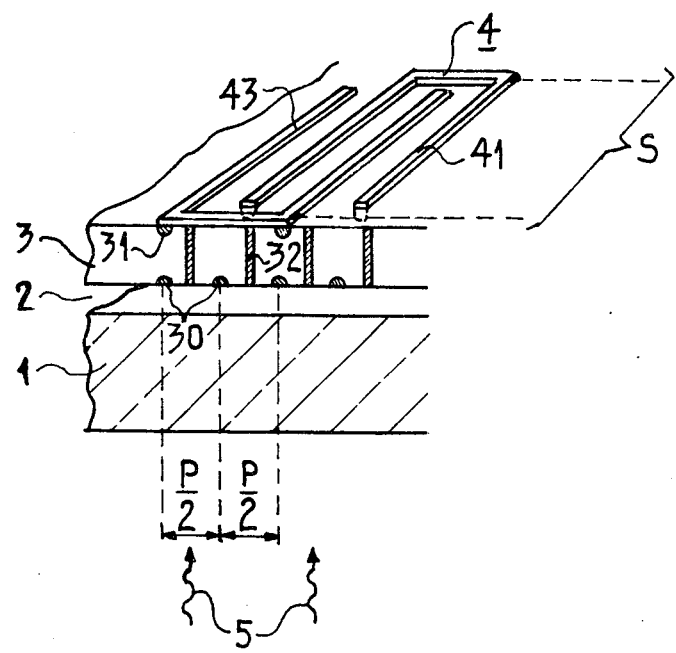

FIG. 4 shows a variant of the device illustrated in FIG. 3, in which the structure based on interdigital combs is obtained by modifying the internal structure of the semiconductor which forms the photoconductive layer 3.

At the level of the zone of interaction ABCD of FIG. 1, FIG. 4 shows the piezoelectric substrate 1 and the photoconductive semiconductor 3 separated by an air gap 2. The image to be read (arrows 5) is projected from the side of the substrate 1.

In the semiconductor 3, diode structures are formed at intervals of $p/2$, i.e., for example in silicon of type P, bands 30 with N-type doping opposite the substrate 1. The signal is then collected by electrodes 43 and 41 in the form of interdigital combs with a spacing $p$ which only form ohmic contacts deposited onto bands 31 of the layer 3 with P+ - type doping situated opposite the bands 30 on that surface of the semiconductor opposite the substrate 1.

The effectiveness of the device may be increased by the formation between each diode of "walls" 32 in the layer 3, i.e. zones doped in such a way as to obtain decoupling of the adjacent diodes.

FIGS. 5 to 8 show variants of the device according to the invention in which the signal S arising out of the nonlinear interaction is extracted by spatial modulation of the zone of interaction.

Figure 5:
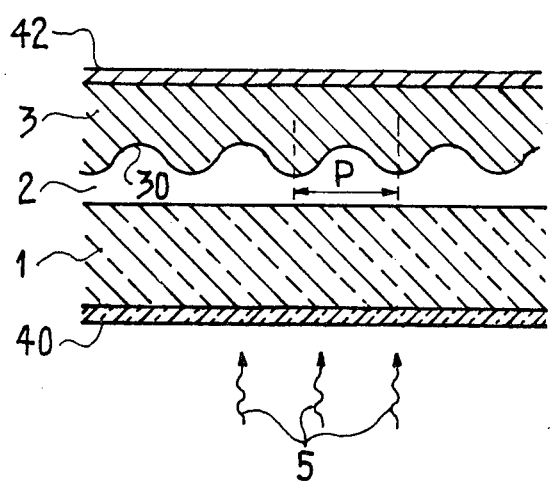

In FIG. 5, modulation is obtained by that of the dielectric layer (air) 2 separating the photoconductor 3 from the substrate 1. The device thus comprises the substrate 1, a transparent electrode 40 on that surface of the substrate 1 which is opposite the layer 3 (side from which the image is projected, arrows 5), the photoconductive layer 3 of which the surface opposite the substrate is undulated, substantially sinusoidally for example, with a period equal to the interval $p$, and of which the other surface is covered by an electrode 42. The reading signal S is collected at the terminals of the electrodes 40 and 42.

In FIG. 6, modulation is obtained by doping the semiconductive layer 3 along parallel, transverse bands 44 extending throughout the entire thickness of the layer 3 and separated by a distance $p$. This doping is for example of N+-type where the layer 3 is of P-type.

Once again, the image is projected (arrows 5) onto the substrate 1 and the reading signal (S) is collected between the two electrodes 40 and 41 situated on the outer surfaces of the substrate 1 and the photoconductor 3, respectively.

In FIG. 7, modulation is obtained by modulation of the internal structure of the semiconductive layer 3 by PN or NP junctions or by Schottky diodes or even by MOS (Metal Oxide Semiconductor) structures. In the embodiment illustrated by way of example in FIG. 7, the layer 3 is formed by silicon of N type and comprises bands 45 with P-type doping separated by a distance p (contrary to the embodiment illustrated in FIG. 4), the signal S being extracted between the two continuous electrodes 40 and 42.

Finally, in FIG. 8, modulation is obtained by means of an opaque grid 46 which may additionally perform the function of the electrode 40 of the preceding embodiments and which is deposited on that surface of the substrate onto which the image to be read is projected. This grid 46 produces a network of shadow bands 47 on the photoconductor 3 with a spacing (p) equal to that of the grid. In the same way as before, the signal S arising out of the interaction is extracted between the grid 46 and the continuous electrode 42, arranged on the upper surface of the photoconductor 3.

The foregoing description applies to reading by pulses of short duration which gives a signal representing the sequential analysis of the image point by point.

It is also possible for reading to be carried out by the transmission of a brief pulse from one of the transducers, whilst a long coded wave (coded in frequency, amplitude or phase) is transmitted from the other transducer. In this case, a signal representative of an image band according to the wave plane of the pulse is obtained at any instant. Another possibility is to transmit a coded wave of long duration from each transducer so as to obtain a transform of the complete image. The signal thus obtained, instead of representing a point of the image, represents twice the sum (over the interaction surface) of the instananuous interactions. In this case, the device requires a decoder for supplying a useful reading signal.

In addition, as mentioned earlier on, the structure according to the invention, instead of being formed from two separate materials (semiconductor-photoconductor on the one hand and piezoelectric on the other hand), may be formed by a single substrate which is both piezoelectric and semiconductive. Thus, the structure shown in FIG. 8 in particular may be used for a single piezoelectric and semiconductive substrate, for example of cadmium sulphide. The same applies to the structure shown in FIG. 4, the single substrate being doped in the same way as the layer 3 and covered by combs 4. Finally, the structure doped in the same way as illustrated for the layer 3 on that of its surfaces over which the elastic waves are propagated, these zones (45) being connected together by a single comb and the signal being collected between this comb and the electrode 40.

Of course the invention is not limited to the embodiment described and shown which was given solely by way of example.

We claim:

1. A device for the two-dimensional reading of an optical image using elastic surface waves, comprising a first piezoelectric medium at the surface of which elastic waves are capable of being propagated, and a second medium which is both semiconductive and photoconductive and in which the electrical fields associated with said elastic waves are capable of creating nonlinear interactions and where said image is projected, producing therein a spatial variation in conductivity, said first medium carring at least two electromechanical transducers which transmit elastic surface waves having the same frequency, in two separate directions of which the intersection defines a zone of interaction where said nonlinear interactions occur, the intensity of said interactions being modulated by said spatial variation in conductivity, said waves being transmitted respectively by said transducers with a period at least equal to the scanning time of the zone of interaction by an elastic wave and with variable relative delays, said device further comprising means for extracting the time independent signals produced by said nonlinear interaction, said extracting means having a spatial periodicity which corresponds to the one of said time independent signals.

2. A device as claimed in claim 1, wherein said two media are formed by a single substrate which is semiconductive, photoconductive and piezoelectric.

3. A device as claimed in claim 1, wherein said first medium is formed by a piezoelectric substrate, whilst said second medium is formed by a semiconductor material arranged in the proximity of that of the surfaces of said substrate which carries the transducers.

4. A device as claimed in claim 1, wherein said elastic waves are two series of brief pulses transmitted respectively by said two transducers, each of the pulses transmitted by one of the transducers encountering a pulse transmitted by the other transducer in a zone which forms an elementary reading zone of said image, said zone moving along a straight line as a function of time, this straight line forming an analysis line of said image, a frame of substantially parallel lines being obtained by the variation in said delay between the pulses transmitted by each of the transducers.

5. A device as claimed in claim 1, wherein said two separate directions are substantially normal one another.

6. A device as claimed in claim 3, comprising a thin dielectric layer formed by air between said substrate and said semiconductor material.

7. A device as claimed in claim 1, wherein one of said transducers transmits a series of brief pulses whilst the other of said transducers transmits a series of long waves, the interaction of each of said pulses with a long wave producing a signal representing a band of said image.

8. A device as claimed in claim 1, wherein said transducers each transmit a series of long waves, the interaction of two of said waves producing a signal representing a transform of said image.

9. A device as claimed in claim 3, wherein said extraction means are formed by two electrodes in the form of interdigital combs which are deposited either on that surface of said substrate opposite said semiconductor or on that surface of the semiconductor opposite the substrate, the spacing of said combs being the spatial interval of the signal arising out of said nonlinear interaction.

10. A device as claimed in claim 1, wherein said extraction means are formed by diodes formed in said semiconductor medium along substantially parallel bands spaced apart from one another at regular intervals equal in distance to half the spatial interval of the signal arising out of said nonlinear interaction, these diodes being alternately connected to one another by electrodes in the form of interdigital combs.

11. A device as claimed in claim 3, wherein said extraction means comprise a substantially sinusoidal undulation of that surface with a periodicity equal to the spatial interval of the signal arising out of said nonlinear interaction, and two electrodes respectively deposited on those surfaces of the substrate and the semiconductor material which are not opposite one another.

12. A device as claimed in claim 3, wherein said extraction means comprise substantially parallel bands of zones doped with one conductivity type opposite to that of the semiconductor with a periodicity equal to the spatial interval of the signal arising out of said nonlinear interaction, said bands extending throughout the entire thickness of said semiconductor, and two electrodes respectively deposited on those surfaces of the substrate and the semiconductor material which are not opposite one another.

13. A device as claimed in claim 1, wherein said extraction means comprise bands of limited thickness doped with a conductivity type opposite to that of the semiconductor medium and forming with said semiconductor medium diode structures with a periodicity equal to the spatial interval of the signal arising out of said nonlinear interaction, and two electrodes deposited respectively on to those surfaces of said piezoelectric medium and said semiconductor medium which are not opposite one another.

14. A device as claimed in claim 1, wherein said extraction means comprise a first electrode in the form of a grid of parallel bands with a periodicity equal to the spatial periodicity of the signal arising out of said nonlinear interaction, said image to be read being projected from the side of said grid and the shadow formed by said grid on said semiconductor medium producing a modulation of the light intensity on said semiconductor medium, and a second electrode, deposited on the surface of said semiconductive medium which is opposite the surface where said shadow is created.

* * * * *